United States Patent [19]

Yamaguchi et al.

[11] Patent Number: 4,933,925
[45] Date of Patent: * Jun. 12, 1990

[54] OPTICAL TRACKING CONTROL APPARATUS FOR CONTROLLING A TRACKING OF A LIGHT BEAM WHICH SCANS AN INFORMATION RECORDING DISC USING PRE-FORMATTED GUIDE TRACKS HAVING AN INTERRUPTED SIGNAL FORMAT

[75] Inventors: Hirohisa Yamaguchi; Hiroshi Usami, both of Tokyo, Japan

[73] Assignee: Teac Corporation, Musashino, Japan

[*] Notice: The portion of the term of this patent subsequent to Feb. 7, 2006 has been disclaimed.

[21] Appl. No.: 926,562

[22] Filed: Oct. 31, 1986

[30] Foreign Application Priority Data

Nov. 7, 1985 [JP] Japan .................................. 60-249530

[51] Int. Cl.⁵ .................................................. G11B 7/00
[52] U.S. Cl. ................................. 369/46.27; 369/44.11
[58] Field of Search .................... 369/46, 43, 45, 59, 369/44; 360/59

[56] References Cited

U.S. PATENT DOCUMENTS

| 4,094,013 | 6/1978 | Hill et al. | 369/44 X |
| 4,363,116 | 12/1982 | Kleuters et al. | 369/45 X |
| 4,472,748 | 9/1984 | Kato et al. | 360/59 |
| 4,486,791 | 12/1984 | Wada et al. | 369/45 X |
| 4,497,048 | 1/1985 | Kimura | 369/46 |
| 4,502,134 | 2/1985 | Kondo et al. | 369/46 |
| 4,544,838 | 10/1985 | Musha et al. | 369/46 X |
| 4,748,609 | 5/1988 | Yonezawa et al. | 369/46 X |

FOREIGN PATENT DOCUMENTS

| 58-102347 | 6/1983 | Japan | 369/275 |
| 60-157740 | 7/1984 | Japan | 369/44 |

*Primary Examiner*—Aristotelis M. Psitos
*Attorney, Agent, or Firm*—Ladas & Parry

[57] ABSTRACT

An optical tracking control apparatus comprises a differential amplifier for differentially amplifying signals respectively reproduced from two mutually adjacent track turns of a guide track on both sides of an intermediate part in which an information signal is recorded and reproduced on and from a disc, a zero crossing detector for detecting a zero crossing of an output signal of the differential amplifier and for producing a switching pulse signal, and a polarity inverting circuit responsive to the switching pulse signal for alternately inverting the polarity of a crosstalk component reproduced from the two mutually adjacent track turns of the guide track as crosstalk for every one-half period of the switching pulse signal. An output signal of the polarity inverting circuit is used as a tracking error signal for controlling the tracking of the light beam.

7 Claims, 4 Drawing Sheets

OPTICAL TRACKING CONTROL APPARATUS FOR CONTROLLING A TRACKING OF A LIGHT BEAM WHICH SCANS AN INFORMATION RECORDING DISC USING PRE-FORMATTED GUIDE TRACKS HAVING AN INTERRUPTED SIGNAL FORMAT

BACKGROUND OF THE INVENTION

The present invention generally relates to optical tracking control apparatuses, and more particularly to an optical tracking control apparatus for a recording and/or reproducing apparatus which records and/or reproduces an information signal by use of a light beam, wherein the tracking of the light beam is controlled during the recording and reproduction based on tracking information which is obtained by scanning guide tracks which are pre-formed on an information recording disc.

When recording an information signal on an information recording disc (hereinafter simply referred to as a disc) by a light beam, it is known from a Japanese Laid-Open Patent Application No. 49-113601, for example, to first form a guide track on an unrecorded disc and then record the information signal on the disc by guiding the light beam by use of the guide track. The guide track may be constituted by a pair of continuous spiral tracks having a predetermined depth and located on both sides of a main track on and from which the information is recorded and reproduced. On the other hand, the guide track may be constituted by a single continuous spiral track having a predetermined depth.

When recording or reproducing the information signal on or from the disc which is formed with the pair of continuous spiral guide tracks, a pair of sub light beams for tracking are used in addition to a main light beam for recording or reproducing the information signal. The sub light beams are irradiated on the disc at positions which respectively lead and trail a position irradiated by the main light beam in the scanning direction and are mutually deviated in a direction along the width of the main track. A tracking control is carried out so that one of the sub light beams is irradiated on a portion of one of the guide tracks and the other of the sub light beams is irradiated on a portion of the other of the guide tracks. Accordingly, the tracking of the main light beam is controlled to accurately scan the main track so as to record or reproduce the information signal on or from the main track.

On the other hand, in the case of the disc which is formed with a continuous spiral groove having a depth $\lambda/8$ as the single continuous spiral guide track, a single light beam is used to record and reproduce the information signal on and from the guide track, where $\lambda$ denotes the wavelength of the light beam. At the time of the recording, the light beam scans the guide track to form pits of the information signal within the guide track, and the tracking of the light beam is controlled by use of first ($-$1-st and $+$1-st) diffracted lights which are generated when the light beam scans the guide track having the depth $\lambda/8$. In other words, when the light beam is irradiated on the guide track at a center position thereof, the light intensities of the first diffracted lights on right and left sides of the center position are equal to each other. However, when the light beam is irradiated at a position deviated from the center position of the guide track, a difference is introduced between the light intensities of the first diffracted lights. Hence, the tracking control is carried out by detecting the difference between the first diffracted lights.

However, in the case of the conventional disc which is formed with the pair of continuous spiral guide tracks, conditions of the leading and trailing sub light beams differ when recording the information signal by use of the main light beam. That is, the trailing sub light beam is affected by the pits of the information signal recorded by the main light beam. For this reason, there is a problem in that it is impossible to obtain a correct tracking error signal.

On the other hand, in the case of the conventional disc which is formed with the single continuous spiral guide track, the first diffracted lights may or may not be generated when the light beam traverses the guide track at the time of the reproduction, depending on whether the light beam is irradiated on the groove portion or the non-groove portion of the disc. In some cases, reflected lights irradiated on a four-element photodetector which is divided into four optical sensors may become asymmetrical even when the light beam is correctly focused on the disc, and a focal servo operation may be performed erroneously. The reflected lights from the disc are irradiated on the four-element photodetector via a cylindrical lens. A light receiving surface (that is, the irradiated pattern) on the four-element photodetector becomes a perfect circular pattern when the focal point of the light beam is correctly on the disc (that is, in focus), and the irradiated pattern becomes an oval pattern when the focal point of the light beam is above or below the disc (that is, out of focus). Hence, there is a known astigmatic focusing method in which a subtraction is performed between a sum of outputs of a first pair of diagonally arranged optical sensors and a sum of outputs of a second pair of diagonally arranged optical sensors so as to obtain an error signal, and the error signal is supplied to a focal system so as to correct the focal error.

According to a recording and/or reproducing apparatus which employs the astigmatic focusing method to detect the focal error, the irradiated pattern on the four-element photodetector becomes asymmetrical and the sum of the outputs of one pair of diagonally arranged optical sensors becomes greater than the sum of the other pair of diagonally arranged optical sensors as the light beam traverses the guide track of the disc, even when the light beam is correctly focused on the disc. Hence, it is inappropriate to employ the astigmatic focusing method of detecting the focal error in the recording and/or reproducing apparatus for playing the disc which is formed with the single guide track. For this reason, in the recording and/or reproducing apparatus for playing the disc which is formed with the single guide track, it is desirable to employ a knife edge method of obtaining the focal error signal by placing a knife edge at a point where the reflected light beam becomes narrowest in the focused state and by detecting the reflected beam in a two-element photodetector which comprises two optical sensors. However, according to the knife edge method, there is a problem in that the optical system becomes complex because of the high accuracy required for the knife edge, two-element photodetector, lens, focal distance and the like.

Hence, a recording and reproducing apparatus comprising a tracking control apparatus which eliminates the problems described before by carrying out the tracking control based on signals reproduced from guide tracks constituted by rows of intermittent pits was previously proposed in a U.S. patent application Ser. No. 873,407 filed June 12, 1986, in which the assignee is the same as the assignee of the present application. According to the previously proposed apparatus, the two sub light beams are used to form a signal dependent on the period of the pits in one track turn of the guide track, and a tracking error signal is obtained based on signals reproduced from two mutually adjacent track turns of the guide track by the main light beam. In other words, the tracking control is carried out based on the signals reproduced from the two mutually adjacent track turns of the guide track constituted by the rows of intermittent pits. For this reason, the difference between the conditions of the two sub light beams caused by the main light beam at the time of the recording does not introduce a problem and it is possible to carry out an accurate tracking control compared to the tracking control carried out with respect to the conventional disc which is formed with the pair of continuous spiral guide tracks. On the other hand, even when the main light beam traverses the track turn of the guide track at the time of the reproduction, no diffraction occurs in a reflected light from the guide track because the depth of the pits of the guide track is $\lambda/4$. Accordingly, the previously proposed apparatus is unaffected by the diffraction as compared to the tracking control carried out with respect to the conventional disc which is formed with the single continuous spiral guide track, and the astigmatic focusing method can be used to detect the focal error in the recording and reproducing apparatus. Thus, the tracking control can be carried out without making the optical system complex.

However, according to the previously proposed apparatus, when the main light beam traverses a plurality of track turns of an information signal recording track so as to carry out a special reproduction, for example, the tracking error signal becomes a sinusoidal wave signal having the polarity thereof inverted every time the main light beam traverses one track turn of the guide track. Hence, when the main light beam traverses a plurality of track turns of the guide track, it is necessary to invert the polarity of the tracking error signal to the correct polarity in a polarity inverting circuit every time the main light beam traverses one track turn of the guide track. As a result, there are problems in that the inverting circuit is required to correct the polarity of the tracking error signal every time the main light beam traverses one track turn of the guide track, and the circuit construction becomes complex.

SUMMARY OF THE INVENTION

Accordingly, it is a general object of the present invention to provide a novel and useful optical tracking control apparatus in which the problems described heretofore are eliminated.

Another and more specific object of the present invention is to provide an optical tracking control apparatus comprising a differential amplifier for differentially amplifying signals respectively reproduced from two mutually adjacent track turns of a guide track on both sides of an intermediate part in which an information signal is recorded and reproduced on and from a disc by a light beam, a zero crossing detector for detecting a zero crossing of an output signal of the dfferential amplifier and for producing a switching pulse signal, and a polarity inverting means responsive to the switching pulse signal for alternately inverting the polarity of a crosstalk component reproduced from the two mutually adjacent track turns of the guide track as crosstalk for every one-half period of the switching pulse signal. An output signal of the polarity inverting means is a tracking error signal having a predetermined level when the light beam is positioned on the intermediate part between the two mutually adjacent track turns of the guide track. When the light beam traverses track turns of the guide track, the polarity of the output switching pulse signal of the zero crossing detector is inverted every time the light beam traverses one track turn of the guide track. On the other hand, a signal (RF signal) reproduced by the light beam is a triangular wave signal having a slope which is inverted every time the light beam moves from one track turn to a next track turn of the guide track. For this reason, the level of the tracking error signal from the polarity inverting means greatly changes every time the light beam traverses one track turn of the guide track, and the level of the tracking error signal gradually changes with a constant slope at other parts on the disc. In other words, the tracking error signal becomes a sawtooth wave signal. Since the slope of the tracking error signal is constant, there is no need to provide an inverting circuit for inverting the polarity of the tracking error signal every time the light beam traverses one track turn of the guide track.

Other objects and further features of the present invention will be apparent from the following detailed description when read in conjunction with the accompanying drawings.

DETAILED DESCRIPTION

Figure 1:
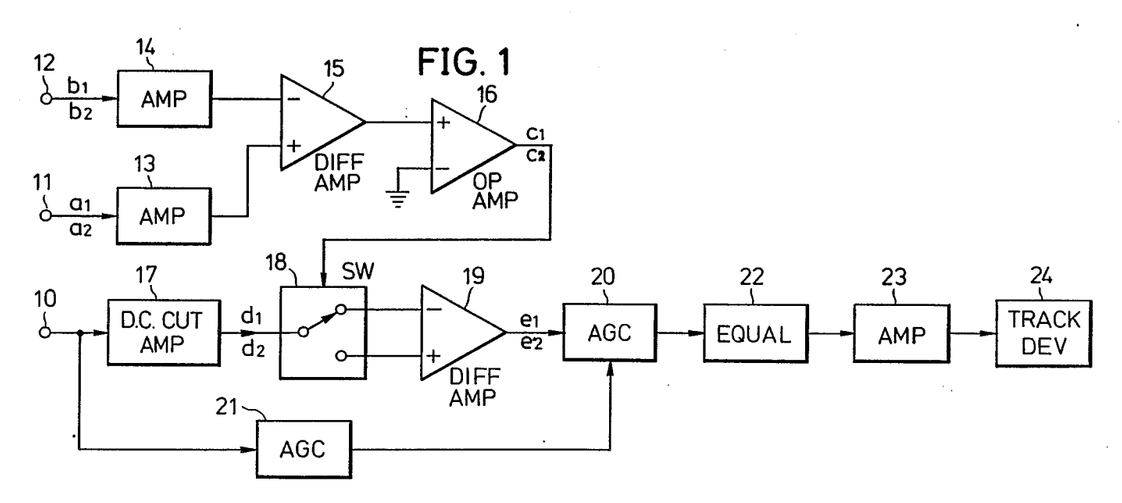
FIG. 1 is a system block diagram showing an embodiment of the optical tracking control apparatus according to the present invention.

FIG. 1 shows an embodiment of the optical tracking control apparatus according to the present invention. A crosstalk component is applied to an input terminal 10. A main light beam scans along a two-dot chain line I in FIG. 2(A) between two mutually adjacent track turns of a spiral guide track or concentric guide tracks (hereinafter simply referred to as guide track turns) on a disc, and the crosstalk component is obtained by passing through a filter circuit (for example, a lowpass filter, not shown) a signal which is reproduced from the disc by the main light beam. This reproduced signal is obtained by detecting the intensity of the main light beam reflected by the disc. On the other hand, reproduced signals a1 and b1 shown in FIGS. 2(B) and 2(C) which are reproduced by first and second sub light beams are applied to input terminals 11 and 12. The first and second sub light beams are irradiated on the disc at positions which respectively lead and trail a position irradiated by the main light beam in a scanning direction and are mutually deviated in a direction along the width of the guide track. In other words, the first and second sub light beams are respectively irradiated on the two mutually adjacent guide track turns on both sides of an intermediate part which is scanned by the main light beam. The reproduced signals a1 and b1 are also obtained by detecting the intensities of the first and second sub light beams reflected by the disc.

Figure 2:
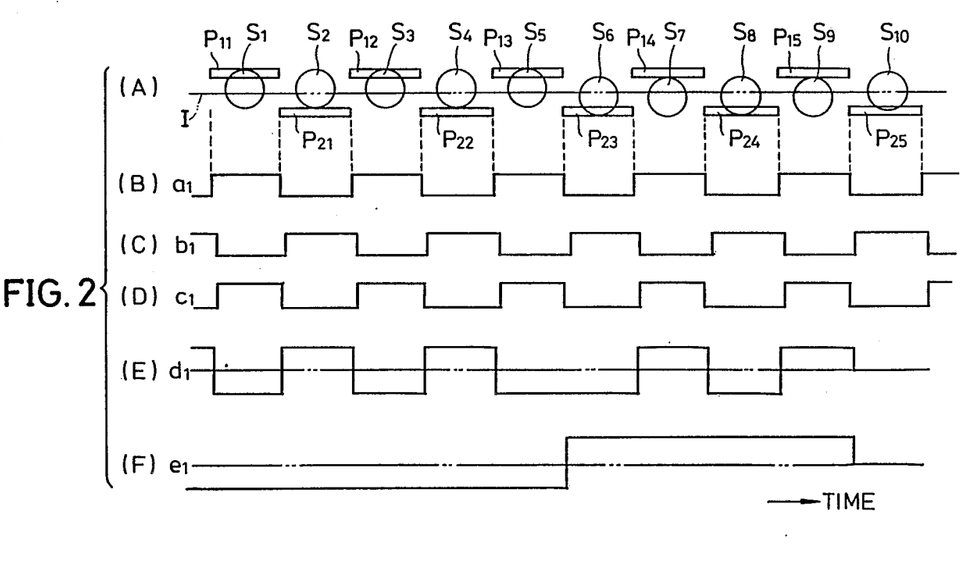
FIG. 2(A) shows the position of a spot of a main light beam.
FIGS. 2(B) through 2(F) show signal waveforms for explaining the operation of the block system shown in FIG. 1 in correspondence with FIG. 2(A)

As shown in FIG. 2(A), the two guide track turns respectively comprise a row of intermittent pits P11 through P15, pits P21 through P25, and the like which are pre-formed on the disc. For example, the pits P11 through P15 denote a portion of a pit group constituting a first guide track turn, and the pits P21 through P25 denote a portion of a pit group constituting a second guide track turn. At the time of the recording, an information signal is recorded on a track turn of an information signal recording track (hereinafter simply referred to as an information track turn) which is formed in the intermediate part between the two mutually adjacent guide track turns by the main light beam. At the time of the reproduction, the recorded information signal is reproduced from the information track turn between the two mutually adjacent guide track turns by the main light beam. In FIG. 2(A), the two-dot chain line I indicates a center line of the information track turn (or the information track turn which is to be formed).

Figure 3:
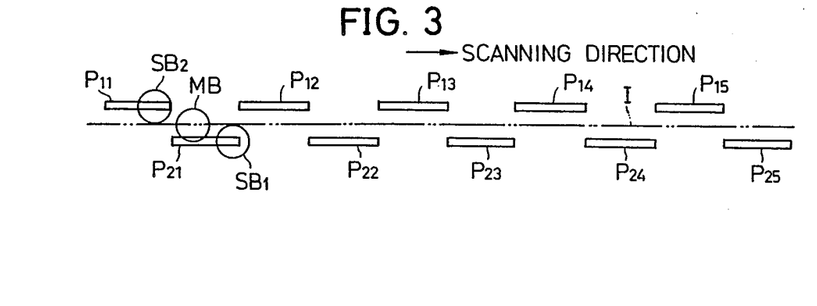
FIG. 3 shows the relationships of scanning positions of spots of main and sub light beams.

FIG. 3 shows the relationships of the scanning positions of a spot MB of a main light beam and spots SB1 and SB2 of first and second sub light beams. In FIG. 3, those parts which are the same as those corresponding parts in FIG. 2(A) are designated by the same reference numerals, and description thereof will be omitted. In actual practice, the spots MB, SB1 and SB2 of the main and sub light beams are extremely close to each other, but FIG. 3 shows the relationship of the pits P11 through P25 and the spots MB, SB1 and SB2 in an exaggerated manner for convenience' sake.

Figure 4:
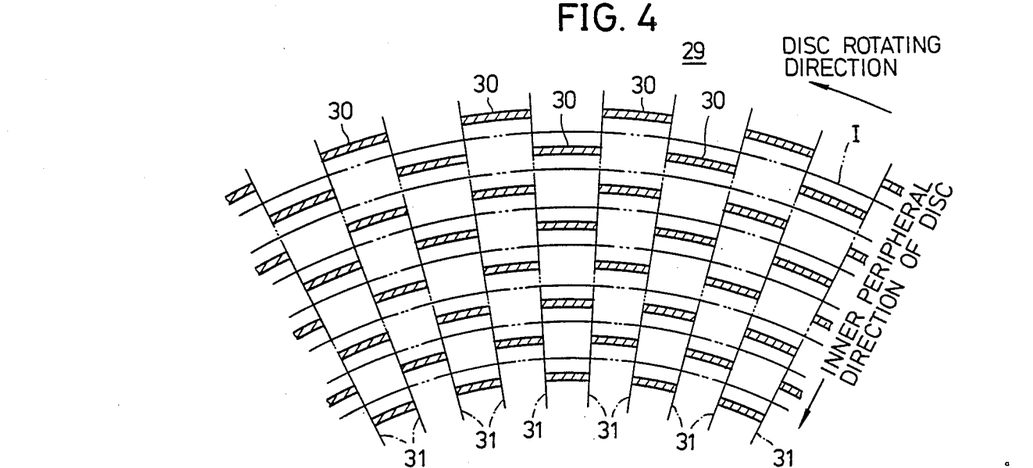
FIG. 4 is a plan view on an enlarged scale showing a part of a disc to which the optical tracking control apparatus according to the present invention may be applied.

Description will now be given with respect to the guide track on the disc. FIG. 4 shows a part of a track pattern formed on a disc 29 on an enlarged scale. The start and end of each pit 30 indicated by hatchings in one imaginary equiangular sectoral region respectively coincide with the end of the pit 30 in one adjacent equiangular sectoral region and the start of the pit 30 in another adjacent equiangular sectoral region. Boundary lines 31 indicated by one-dot chain lines connect the starts and ends of the pits 30 in the radial direction of the disc 29, and these boundary lines 31 define the equiangular sectoral regions. For example, the length of each pit 30 is selected to a value which is equal to a recording length of one horizontal scanning period of a video signal.

Figure 5:
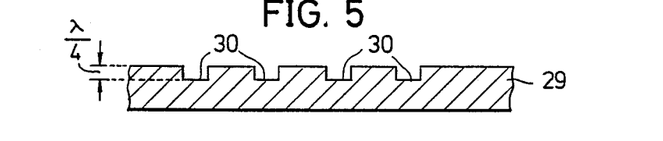
FIG. 5 is a cross sectional view showing an essential part of the disc.

FIG. 5 shows the cross sectional configuration of the disc 29. As shown in FIG. 5, a depth of the pit 30 is selected to $\frac{1}{4}$ the wavelength $\lambda$ of the main and sub light beams. A phase error $\lambda/2$ is introduced between the light reflected within the groove of the pit 30 and the light reflected at a position other than the groove, and the light intensity is greatly attenuated in the case of the light reflected at the groove.

Returning now to the description of the block system shown in FIG. 1, during a time period in which the two sub light beams scan over the respective pits, the phase error $\lambda/2$ is introduced between the light reflected within the groove of the pit and the light reflected at a position other than the groove, and the intensity of the reflected light as a whole is greatly attenuated due to mutual cancellation of the reflected lights. On the other hand, during a time period in which the two sub light beams scan over parts other than the pits, the sub light beams are reflected substantially without being attenuated, and the intensity of the reflected light as a whole is large. Hence, the reproduced signals a1 and b1 which are simultaneously obtained by independently scanning the two mutually adjacent guide track turns have a low level during the time period in which the two sub light beams scan over the respective pits and have a high level during the time period in which the two sub light beams scan over the parts other than the pits, for example. In FIG. 2(A), the relationship of the pits P11 through P25 and spots of the main light beam (hereinafter referred to as main beam spots) is shown in an exaggerated manner for convenience' sake although the actual positional error of the main beam spot is extremely small.

As shown in FIGS. 2(B) and 2(C), the reproduced signals a1 and b1 are square wave signals having a period in correspondence with the period of the pits in each guide track turn. However, in actual practice, the signal waveforms of the reproduced signals a1 and b1 are not perfect square waves as shown due to slight deviations of spots of the sub light beams (hereinafter referred to as sub beam spots) and the like. But even when the signal waveforms of the reproduced signals a1 and b1 are not perfect square waves, it is possible to obtain from the reproduced signals a1 and b1 the information related to the ends of the pits P11 through P25. There is a relative phase error between the phases of the reproduced signals a1 and b1 since the positions of the two sub beam spots are slightly deviated in the scanning direction, but this relative phase error is substantially negligible.

The reproduced signals a1 and b1 applied to the respective input terminals 11 and 12 are passed through respective amplifiers 13 and 14 and are supplied to non-inverting and inverting input terminals of a differential amplifier 15 wherein the two signals are differentially amplified. An output signal of the differential amplifier 5 is supplied to a non-inverting input terminal of an operational amplifier 16 which constitutes a zero crossing detector. An inverting input terminal of the operational amplifier 16 is grounded. The operational amplifier 16 produces a high level signal when the output signal level of the differential amplifier 15 is greater than the ground level (zero level) and produces a low level signal when the output signal level of the differential amplifier 15 is smaller than the zero level. Accordingly, a zero crossing detection signal c1 shown in FIG. 2(D) having a signal waveform similar to that of the reproduced signal a1 is obtained from the operational amplifier 16. In other words, the zero crossing detection signal c1 is a square wave signal which has a high level in correspondence with one of the two mutually adjacent guide track turns on both sides of the information track turn (or the intermediate part where the information track turn is to be formed) and has a low level in correspondence with the other of the two mutually adjacent guide track turns. The zero crossing detection signal c1 has a period dependent on the period of the pits in the guide track turn, and the zero crossing detection signal c1 is supplied to a switching circuit 18 as a switching pulse signal.

On the other hand, the crosstalk component applied to the input terminal 10 is supplied to an automatic gain control (AGC) circuit 21 which will be described later and to a D.C. cutting amplifier 17. An output signal d1 of the D.C. cutting amplifier 17 is supplied to the switching circuit 18. When the main light beam correctly scans the position between the two mutually adjacent guide track turns, a portion of the main beam spot is irradiated over the pit and the intensity of the reflected light becomes slightly attenuated. However, the slight attenuation in the intensity of the reflected light is always constant even when the main beam spot moves from a position where one pit of the one guide track turn is irradiated by the portion of the main beam spot to a position where one pit of the other guide track turn is irradiated by the portion of the main beam spot, because the starts and ends of the pits are aligned on the boundary lines 31 as described before in conjunction with FIG. 4. That is, although the pits are intermittently formed on the disc, the intensity of the main light beam reflected by the disc is substantially unaffected thereby.

For convenience' sake, it will be assumed that the main beam spot sequentially moves along positions S1 through S10 shown in FIG. 2(A). In this case, the output signal d1 of the D.C. cutting amplifier 17 becomes as shown in FIG. 2(E). When the main beam spot takes the positions S1 through S5, the main beam spot is deviated toward the pits in the upper first guide track turn. For this reason, the signal d1 has a low level at the positions S1, S3 and S5 when the main beam spot irradiates a portion of the pits P11, P12 and P13, respectively, since the intensity of the reflected light is small. On the other hand, the signal d1 has a high level at the positions S2 and S4 when the main beam spot does not irradiate the pits P21 and P22. When the main beam spot takes the positions S6 through S9, the main beam spot is deviated toward the pits in the lower second guide track turn. Thus, the level of the signal d1 changes as shown in FIG. 2(E) depending on the existence of the pits P23 and P24. The main beam spot takes an optimum position at the position S10. At the position S10, the main beam spot slightly irradiates a portion of the pit P25, and the signal d1 has an intermediate level between the high and low levels as shown in FIG. 2(E).

The switching circuit 18 is designed to selectively pass and supply the signal d1 to a non-inverting input terminal of a differential amplifier 19 during the high level period of the switching pulse signal c1, and to selectively pass and supply the signal d1 to an inverting input terminal of the differential amplifier 19 during the low level period of the switching pulse signal c1. Accordingly, the signal d1 supplied to the non-inverting input terminal of the differential amplifier 19 is obtained from the differential amplifier 19 with the same phase, and the signal d1 supplied to the inverting input terminal of the differential amplifier 19 is obtained from the differential amplifier 19 with an inverted phase. A signal e1 indicated by a solid line in FIG. 2(F) is obtained from the differential amplifier 19 and is supplied to an AGC circuit 20. The main beam spot is deviated toward the upper first guide track turn when the signal e1 has a level lower than a center level indicated by a two-dot chain line in FIG. 2(F) and is deviated toward the lower second guide track turn when the signal e1 has a level higher than the center level. There is no tracking error when the level of the signal e1 coincides with the center level. In other words, the output signal e1 of the differential amplifier 19 is a tracking error signal.

The level of the tracking error signal e1 is controlled in the AGC circuit 20 based on an output control signal of the AGC circuit 21. The AGC circuits 20 and 21 constitute a compensation circuit for compensating for the variation in the intensity of the reflected light. For example, the variation in the intensity of the reflected light caused by the difference in the light quantities of the main light beam at the time of the recording and the main light beam at the time of the reproduction, dust particles on the surface of the disc and the like is compensated in the compensation circuit. A tracking error signal obtained via the AGC circuit 20 is passed through an equalizer circuit 22 and an amplifier 23 and is supplied to a known tracking device 24. The tracking device 24 minutely displaces optical paths of the main and sub light beams in the direction along the width of the guide track turn responsive to an output signal of the amplifier 23 while maintaining the positional relationship of the main and sub light beams constant. As a result, the tracking of the main light beam is controlled so that the main beam spot always accurately takes the optimum position S10 shown in FIG. 2(A).

The tracking control according to the present invention is carried out during the reproduction when the information signal is reproduced by the main light beam from the information track turn formed between the two mutually adjacent guide track turns and also during the recording when the information signal is recorded by the main light beam by newly forming an information track turn in the intermediate part between the two mutually adjacent track turns. In addition, at the time of the reproduction, the information signal is reproduced from the information track turn by the main light beam simultaneously as the reproduction of the information from the guide track turns by the main light beam. However, the information signal (RF signal) reproduced from the information track turn by the main light beam has a frequency band in the order of MHz while the information (crosstalk component) reproduced from the guide track turns by the main light beam as crosstalk has a frequency band in the order of kHz. Hence, it is possible to supply to the input terminal 10 shown in FIG. 1 only the information (crosstalk component) reproduced from the guide track turns by the main light beam by passing the signal reproduced by the main light beam through a lowpass filter (not shown). In other words, only the crosstalk component is frequency-selected and supplied to the input terminal 10.

Figure 6:
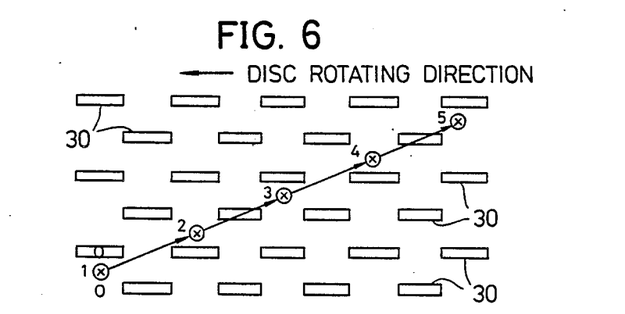
FIG. 6 shows a scanning locus of a main light beam which traverses a plurality of track turns of a guide track.
Figure 7:
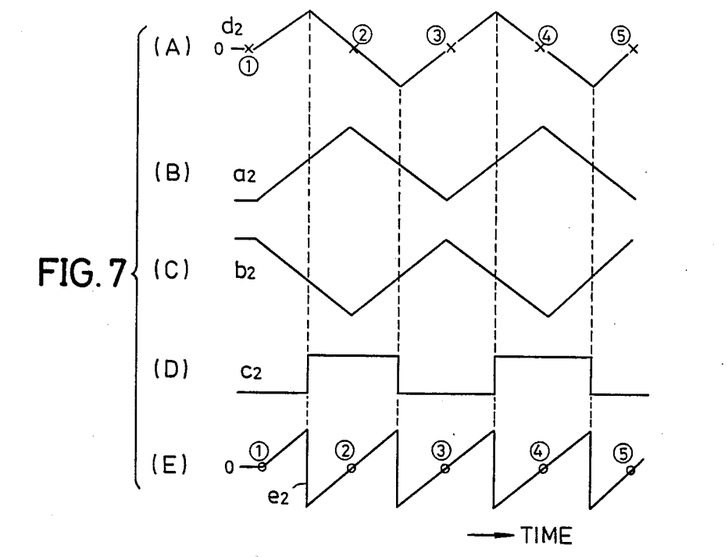
FIGS. 7(A) through 7(E) are signal waveforms for explaining the operation of the block system shown in FIG. 1 when the main light beam moves along the scanning locus shown in FIG. 6.

Next, description will be given with respect to the operation of the optical tracking control apparatus when the main light beam traverses a plurality of guide track turns so as to perform a high-speed search and the like. For example, it will be assumed that the main light beam traverses four guide track turns at positions 1 through 5 as shown in FIG. 6. In other words, the main light beam passes the positions 1→2→3→4→5 in this sequence. The positions 1 through 5 are on the center lines of the respective information track turns, that is, there is no tracking error of the main light beam at the positions 1 through 5. In FIG. 6, rectangles denote the pits 30 pre-formed on the disc. When the main light beam scans along the scanning locus indicated by a solid line in FIG. 6, the signal waveform of a crosstalk component d2 obtained from the D.C. cutting amplifier 17 shown in FIG. 1 becomes as shown in FIG. 7(A). The crosstalk component d2 is a triangular wave signal which has a zero level (center level) when the main beam spot is at the positions 1 through 5 shown in FIG. 6, has a maximum level when the main beam spot is between the pits of one guide track turn, and has a minimum level when the main beam spot is on the pit of one guide track turn. In FIG. 7(A) and FIG. 7(E) which will be described later, ① through ⑤ indicate signals obtained when the main beam spot is at the positions 1 through 5, respectively.

On the other hand, the two sub light beams also scan along scanning loci similar to that of the main light beam. Hence, reproduced signals a2 and b2 applied to the input terminals 11 and 12 shown in FIG. 1 have triangular waveforms of mutually inverted phases as shown in FIGS. 7(B) and 7(C). When the reproduced signals a2 and b2 are differentially amplified in the differential amplifier 15 and the output signal (having a signal waveform similar to that of the reproduced signal a2) of the differential amplifier 15 is supplied to the operational amplifier 16 so as to detect the zero crossing, a zero crossing detection signal (switching pulse signal) c2 shown in FIG. 7(D) is obtained from the operational amplifier 16. This signal c2 is a square wave signal having a polarity which is inverted every time the main light beam reaches a position approximately on the guide track turn. Hence, an output tracking error signal e2 of the differential amplifier 19 shown in FIG. 7(E) has a sawtooth waveform.

As may be seen from FIG. 7(E), the tracking error signal e2 has the center level when the main light beam is positioned on the center line of the information track turn (that is, at any of the positions 1 through 5). Furthermore, the level of the tracking error signal e2 rapidly changes every time the main light beam is positioned approximately on the guide track turn, and the sloping direction of the sawtooth waveform is always in the same direction. For this reason, even when the main light beam traverses a plurality of guide track turns, it is unnecessary to provide an inverting circuit for inverting the polarity of the tracking error signal every time the main light beam traverses one guide track turn because the slope of the tracking error signal e2 is always constant. Moreover, since the level of the tracking error signal e2 rapidly changes every time the main light beam traverses one guide track turn, it can be seen that the the capture range in which the tracking can be carried out is extremely wide and the stability of the tracking control is excellent.

Figure 8:
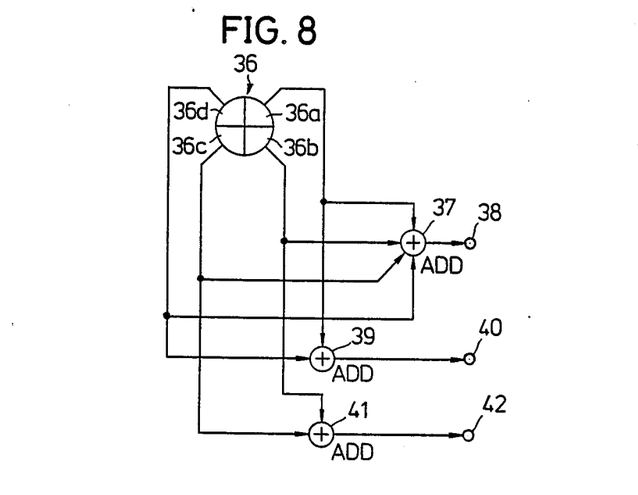
FIG. 8 shows an embodiment of a photodetector which may be applied to the optical tracking control apparatus according to the present invention.

The present embodiment is not limited to the embodiment described heretofore, and the present invention may be applied to a recording and/or reproducing apparatus which uses only a single light beam for the recording and reproduction of the information signal, that is, without the use of the sub light beams. In this case, a photodetector of the recording and/or reproducing apparatus is constructed as shown in FIG. 8. In FIG. 8, a photodetector 36 comprises four light receiving parts 36a through 36d. Output signals of the light receiving parts 36a through 36d are added in an adder 37, and a signal reproduced from the information track turn (or the part on the disc where the information track turn is to be formed) by the single light beam is supplied to the input terminal 10 shown in FIG. 1 via an output terminal 38 and a lowpass filter (not shown) which passes only the crosstalk component. The reflected light beam from one of the two mutually adjacent guide track turns on both sides of the information track turn is detected by the light receiving parts 36a and 36d, and the reflected light beam from the other of the two mutually adjacent guide track turns is detected by the light receiving parts 36b and 36c. Accordingly, an adder 39 adds the output signals of the light receiving parts 36a and 36d to obtain a first signal reproduced from the one guide track turn as crosstalk, and this first signal is supplied to the input terminal 11 shown in FIG. 1 via an output terminal 40. Similarly, an adder 41 adds the output signals of the light receiving parts 36b and 36c to obtain a second signal reproduced from the other guide track turn as crosstalk, and this second signal is supplied to the input terminal 12 via an output terminal 42.

As described heretofore, even when the light beam traverses a plurality of guide track turns during a high-speed search, for example, there is no need to provide an inverting circuit for inverting the polarity of the tracking error signal every time the light beam traverses one guide track turn because the tracking error signal obtained in the present invention is a sawtooth wave having a constant slope. For this reason, the optical tracking control apparatus can be produced at a low cost. In addition, since the level of the tracking error signal changes rapidly every time the light beam traverses the guide track turn, it is possible to make the capture range in which the tracking control can be carried out extremely wide and to carry out a stable tracking control.

Further, the present invention is not limited to these embodiments, but various variations and modifications may be made without departing from the scope of the present invention.

What is claimed is:

1. An optical tracking control apparatus for controlling a tracking of a light beam which scans an information recording disc, said information recording disc comprising a recording surface which is divided into a plurality of imaginary equiangular sectoral regions each of which is defined by two of a plurality of imaginary radial lines, and a guide track formed on said recording surface, said guide track comprising a spiral track or concentric tracks, each track turn of said guide track being constituted by a row of pits formed in every other of said equiangular sectoral regions, said pit being only formed in one of two mutually adjacent track turns of the guide track in each of said equiangular sectoral regions so that the pits are formed in every other track turns of the guide track in a radial direction of the information recording disc in each of said equiangular sectoral regions, each pit having two ends which respectively lie on two imaginary radial lines defining an equiangular sectoral region in which said each pit is formed, said optical tracking control apparatus controlling the tracking of the light beam so that the light beam scans an intermediate part between center lines of said two mutually adjacent track turns of the guide track during recording and reproduction, said optical tracking control apparatus comprising:
    differential amplifier means having a non-inverting input terminal and an inverting input terminal respectively supplied with signals respectively reproduced from two mutually adjacent track turns of the guide track on both sides of the intermediate part which is scanned by the light beam;

zero crossing detector means for detecting a zero crossing of an output signal of said differential amplifier means and for producing a switching pulse signal having a period dependent on a period of the pits in each track turn of the guide track;

polarity inverting means supplied with said switching pulse signal and a crosstalk component reproduced from the two mutually adjacent track turns of the guide track on both sides of the intermediate part which is scanned by the light beam for generating a tracking error signal by alternately inverting a polarity of said crosstalk component for every one-half period of said switching pulse signal, said polarity inverting means producing as said tracking error signal a sawtooth wave signal when said light beam traverses a plurality of track turns of said guide track, said sawtooth wave signal having a waveform such that every sloping part thereof have substantially the same slope; and a tracking device responsive to said tracking error signal for controlling a displacement of the light beam in a direction along a width of the guide track, so that the light beam accurately scans over the intermediate part.

2. An optical tracking control apparatus as claimed in claim 1 in which said zero crossing detector means comprises an operational amplifier having a first input terminal which is grounded and a second input terminal supplied with the output signal of said differential amplifier means.

3. An optical tracking control apparatus as claimed in claim 1 in which said polarity inverting means comprises a switching circuit supplied with said crosstalk component for alternately producing said crosstalk component from first and second output terminals thereof responsive to said switching pulse signal, and a differential amplifier having a non-inverting input terminal and an inverting input terminal respectively supplied with signals obtained from the first and second output terminals of said switching circuit for producing said tracking error signal.

4. An optical tracking control apparatus as claimed in claim 1 in which said light beam comprises a main light beam and first and second sub light beams, said first and second sub light beams scanning positions which respectively lead and trail a scanning position of said main light beam in a scanning direction and mutually differ in the direction along the width of the guide track, said differential amplifier means being supplied with signals respectively reproduced by said first and second sub light beams from the two mutually adjacent track turns of the guide track on both sides of the intermediate part which is scanned by said main light beam, said polarity inverting means being supplied with a crosstalk component reproduced by said main light beam from the two mutually adjacent track turns of the guide track on both sides of the intermediate part which is scanned by said main light beam.

5. An optical tracking control apparatus as claimed in claim 1 in which said light beam comprises a single light beam, said differential amplifier means being supplied with signals respectively reproduced by said single light beam from the two mutually adjacent track turns of the guide track on both sides of the intermediate part which is scanned by said single light beam, said polarity inverting means being supplied with a crosstalk component reproduced by said single light beam from the two mutually adjacent track turns of the guide track on both sides of the intermediate part which is scanned by said single light beam.

6. An optical tracking control apparatus for controlling a tracking of a light beam which scans an information recording disc, said information recording disc comprising a recording surface which is divided into a plurality of imaginary equiangular sectoral regions each of which is defined by two of a plurality of imaginary radial lines, and a guide track formed on said recording surface, said guide track comprising a spiral track or concentric tracks, each track turn of said guide track being constituted by a row of pits formed in every other of said equiangular sectoral regions, said pit being only formed in one of two mutually adjacent track turns of the guide track in each of said equiangular sectoral regions so that the pits are formed in every other track turns of the guide track in a radial direction of the information recording disc in each of said equiangular sectoral regions, each pit having two ends which respectively lie on two imaginary radial lines defining an equiangular sectoral region in which said, each pit is formed, said optical tracking control apparatus controlling the tracking of the light beam so that the light beam scans an intermediate part between center lines of said two mutually adjacent track turns of the guide track during recording and reproduction, said optical tracking control apparatus comprising:

differential amplifier means having a non-inverting input terminal and an inverting input terminal respectively supplied with signals respectively reproduced from two mutually adjacent track turns of the guide track on both sides of the intermediate part which is scanned by the light beam;

zero crossing detector means for detecting a zero crossing of an output signal of said differential amplifier means and for producing a switching pulse signal having a period dependent on a period of the pits in each track turn of the guide track;

polarity inverting means supplied with said switching pulse signal and a crosstalk component reproduced from the two mutually adjacent track turns of the guide track on both sides of the intermediate part which is scanned by the light beam for generating a tracking error signal by alternately inverting a polarity of said crosstalk component for every one-half period of said switching pulse signal, said polarity inverting means producing as said tracking error signal a sawtooth wave signal when said light beams traverses a plurality of track turns of said guide track, said sawtooth wave signal having a waveform such that every sloping part thereof have substantially the same slope;

a tracking device responsive to said tracking error signal for controlling a displacement of the light beam in a direction along a width of the guide track, so that the light beam accurately scans over the intermediate part;

a first automatic gain control circuit supplied with said crosstalk component; and a second automatic gain control circuit for controlling a level of said tracking error signal which is supplied to said tracking device based on an output control signal of said first automatic gain control circuit.

7. An optical tracking control apparatus for controlling a tracking of a light beam which scans an information recording disc, said information recording disc comprising a recording surface which is divided into a plurality of imaginary equiangular sectoral regions each of which is defined by two of a plurality of imaginary radial lines, and a guide track formed on said recording surface, said guide track comprising a spiral track or concentric tracks, each track turn of said guide track being constituted by a row of pits formed in every other of said equiangular sectoral regions, said pit being only formed in one of two mutually adjacent track turns of the guide track in each of said equiangular sectoral regions so that the pits are formed in every other track turns of the guide track in a radial direction of the information recording disc in each of said equiangular sectoral regions, each pit having two ends which respectively lie on two imaginary radial lines defining an equiangular sectoral region in which said each pit is formed, said optical tracking control apparatus controlling the tracking of the light beam so that the light beam scans an intermediate part between center lines of said two mutually adjacent track turns of the guide track during recording and reproduction, said optical tracking control apparatus comprising: signal for controlling a displacement of the light beam in a direction along a width of the guide track, so that the light beam accurately scans over the intermediate part; and a D.C. cutting amplifier for cutting a D.C. component and amplifying said crosstalk component which is supplied to said polarity inverting means.

* * * * *